(12) United States Patent
Tiirola et al.

(10) Patent No.: US 10,206,201 B2
(45) Date of Patent: Feb. 12, 2019

(54) METHOD AND APPARATUS FOR TRANSMITTING AND/OR RECEIVING REFERENCE SIGNALS

(71) Applicant: Nokia Solutions and Networks Oy, Espoo (FI)

(72) Inventors: Esa Tapani Tiirola, Kempele (FI); Kari Pekka Pajukoski, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 11 days.

(21) Appl. No.: 15/311,001

(22) PCT Filed: May 15, 2014

(86) PCT No.: PCT/EP2014/059904
§ 371 (c)(1),
(2) Date: Nov. 14, 2016

(87) PCT Pub. No.: WO2015/172830
PCT Pub. Date: Nov. 19, 2015

(65) Prior Publication Data
US 2017/0111895 A1      Apr. 20, 2017

(51) Int. Cl.
*H04W 72/04* (2009.01)
*H04L 5/00* (2006.01)
*H04L 5/16* (2006.01)
*H04L 5/14* (2006.01)
*H04B 7/0452* (2017.01)
*H04B 7/06* (2006.01)

(52) U.S. Cl.
CPC ....... *H04W 72/0413* (2013.01); *H04L 5/0051* (2013.01); *H04L 5/14* (2013.01); *H04L 5/16* (2013.01); *H04W 72/042* (2013.01); *H04B 7/0452* (2013.01); *H04B 7/0617* (2013.01); *H04B 7/0626* (2013.01); *H04L 5/0005* (2013.01)

(58) Field of Classification Search
None
See application file for complete search history.

(56) References Cited

U.S. PATENT DOCUMENTS

| 2011/0171964 | A1* | 7/2011 | Lin ...................... H04L 5/0023 455/450 |
| 2011/0317597 | A1* | 12/2011 | Wan .................... H04L 27/2602 370/281 |
| 2012/0320806 | A1* | 12/2012 | Ji ........................ H04B 7/2656 370/280 |

(Continued)

FOREIGN PATENT DOCUMENTS

GB        2398455 A       8/2004

OTHER PUBLICATIONS

International Search Report and Written Opinion received for corresponding Patent Cooperation Treaty Application No. PCT/EP2014/059904, dated Jan. 15, 2015, 12 pages.

(Continued)

*Primary Examiner* — Otis L Thompson, Jr.
(74) *Attorney, Agent, or Firm* — Nokia Technologies Oy

(57) ABSTRACT

A method comprising: causing a user equipment to transmit a first reference signal to a base station using a frequency band which is used by said base station to transmit to said user equipment, said user equipment having a different frequency band for transmitting to said base station.

20 Claims, 7 Drawing Sheets

(56) References Cited

U.S. PATENT DOCUMENTS

| | | | | |
|---|---|---|---|---|
| 2013/0029713 | A1* | 1/2013 | Jang | H04W 24/10 455/517 |
| 2013/0114559 | A1 | 5/2013 | Fujimoto | |
| 2013/0182594 | A1 | 7/2013 | Kim et al. | |
| 2013/0188473 | A1* | 7/2013 | Dinan | H04W 56/0005 370/216 |
| 2013/0229941 | A1* | 9/2013 | Huang | H04B 7/0452 370/252 |
| 2013/0242911 | A1* | 9/2013 | Heo | H04L 5/001 370/329 |
| 2013/0303171 | A1* | 11/2013 | Jang | H04W 36/30 455/436 |
| 2014/0086085 | A1* | 3/2014 | Zheng | H04L 5/0048 370/252 |
| 2014/0086119 | A1* | 3/2014 | Yang | H04L 5/0007 370/280 |
| 2014/0185495 | A1* | 7/2014 | Kuchibhotla | H04W 76/023 370/281 |
| 2014/0185530 | A1* | 7/2014 | Kuchibhotla | H04W 76/023 370/329 |
| 2014/0187283 | A1* | 7/2014 | Nimbalker | H04W 72/048 455/550.1 |
| 2015/0163036 | A1* | 6/2015 | Thomas | H04L 5/0044 370/281 |
| 2015/0305057 | A1* | 10/2015 | Eriksson | H04W 72/1268 370/280 |
| 2016/0254901 | A1* | 9/2016 | You | H04W 76/048 370/281 |
| 2018/0076924 | A1* | 3/2018 | Lee | H04L 1/0026 |

OTHER PUBLICATIONS

"Study on 3D-channel model for Elevation Beamforming and FD-MIMO studies for LTE", 3GPP™ Work Item Description, RP-122034, 2012, 6 pages.

"3rd Generation Partnership Project; Technical Specification Group Radio Access Network; Evolved Universal Terrestrial Radio Access (E-UTRA); Physical channels and modulation(Release 12)", 3GPP TS 36.211, V12.1.0, Mar. 2014, pp. 1-120.

Office action received for corresponding European Patent Application No. 14724724.1, dated Oct. 23, 2017, 6 pages.

* cited by examiner

METHOD AND APPARATUS FOR TRANSMITTING AND/OR RECEIVING REFERENCE SIGNALS

RELATED APPLICATION

This application was originally filed as Patent Cooperation Treaty Application No. PCT/EP2014/059904 filed May 15, 2014.

This disclosure relates to an apparatus and method and in particular but not exclusively to an apparatus and method for use transmitting and/or receiving reference information for providing channel state information.

A wireless communication system can be seen as a facility that enables communication sessions between two or more nodes such as fixed or mobile devices capable of wireless communications, access nodes such as base stations, relays, machine type devices, servers and so on. Examples of wireless systems include public land mobile networks (PLMN) such as cellular networks, satellite based communication systems and different wireless local networks, for example wireless local area networks (WLAN). A communication system and compatible communicating entities typically operate in accordance with a given standard or specification which sets out what the various entities associated with the system are permitted to do and how that should be achieved. For example, the standards, specifications and related protocols can define the manner how various entities shall communicate, how various aspects of the communications shall be implemented and how different entities involved in communications shall be configured.

A user can access the communication system via a base station or another access node by means of an appropriate communication device. A communication device of a user is often referred to as user equipment (UE) or terminal. A communication device is provided with an appropriate signal receiving and transmitting arrangement for enabling communications with other nodes such as a base station or another communication device. In certain systems the base station is referred to as Node B (NB) or enhanced NodeB (eNB).

Channel state information (CSI) is an example of information that is used in wireless systems. CSI is typically used for defining properties of a communication channel to describe how a signal propagates from a transmitter to a receiver. CSI represents the combined effect of, for example, scattering, fading, and power decay with distance. CSI makes it possible to adapt transmissions to current channel conditions and can be advantageously utilised e.g. for achieving reliable communication with high data rates. This can be provided e.g. in multi-antenna systems.

According to an aspect, there is provided a method comprising: causing a user equipment to transmit a first reference signal to a base station using a frequency band which is used by said base station to transmit to said user equipment, said user equipment having a different frequency band for transmitting to said base station.

The method may be performed in a user equipment.

According to another aspect, there is provided a method comprising: causing a user equipment to receive a second reference signal from a base station using a frequency band which is used by said user equipment to transmit to said base station, said user equipment having a different frequency band for receiving from said base station.

The received reference signal may be used to estimate channel information for a channel from said base station to said user equipment.

The method may be performed in a user equipment.

According to another aspect, there is provided a method comprising: causing a base station to receive a first reference signal from a user equipment on a frequency band which is used to transmit from said base station to said user equipment, said user equipment having a different frequency band for transmitting to said base station; and using said received reference signal to estimate channel information for a channel from said base station to said user equipment.

The method may be performed in a base station.

According to another aspect, there is provided method comprising: causing a base station to transmit a second reference signal to a user equipment on a frequency band which is used by said user equipment to transmit to said base station to said user equipment, said user equipment having a different frequency band for receiving from said base station.

The method may be performed in a base station.

Various of the following features may be used with one or more of the above aspects.

The method may comprise causing said reference signal to be transmitted or received in a subframe.

The subframe may comprise a first portion and a second portion separated by a guard period, wherein the first portion is used for uplink communication and the second portion is used for downlink communication.

The first portion may be provided before or after the second portion.

The first reference signal may be provided in said first portion.

The first reference signal may be transmitted from the user equipment. The first reference signal may be received by said base station.

Other signals may be provided in the second portion. In some embodiments, those other signals may be the second reference signal. In some embodiments, those other signals may be signals other than a second reference signal.

The second reference signal may be provided in said second portion.

The second reference signal may be transmitted from the base station. The second reference signal may be received by said user equipment.

Other signals may be transmitted in the first portion. In some embodiments, those other signals may be the first reference signal. In some embodiments, those other signals may be signals other than a first reference signal.

The first portion maybe an uplink pilot time slot and the second portion may be a downlink pilot time slot.

The method may comprise controlling when said reference signal is transmitted in said subframe using timing advance control.

The method may comprise configuring the subframe having the reference signal.

The configuring of the subframe may comprise determining which of a plurality of subframes is the subframe having said reference signal. The configuring of the subframe may alternatively or additionally comprise determining a split in the subframe between the first portion, the second portion and the guard period.

The configuring the subframe may comprise selecting one of a plurality of subframe timing configurations for said subframe having the reference signal.

The method may comprise configuring reference signal resources for at least one user equipment.

The configuring of the reference signal resources may comprise determining which reference signal resources to use. The configuring of the reference signal resource may additionally comprise determining which subframe is to be used and/or which portion of said subframe is to be used.

The method may comprise configuring a timing of said subframe such that said subframe coincides with a further subframe for at least one user equipment which does not comprise a random access channel.

The method may comprise configuring the timing of said subframe such that said subframe coincides with a further subframe for at least one user equipment, said further subframe comprising a multi-media broadcast over a single frequency network subframe.

The method may comprise receiving signals from said user equipment on said different frequency band when receiving said first reference signal.

The method may comprise prioritizing one or more other transmissions over transmission of said reference signals.

The reference signal may comprise at least one of a sounding reference signal, a common reference signal and a channel state information reference signal.

According to another aspect, there is provided an apparatus for use in a user equipment, said apparatus comprising at least one processor and at least one memory including computer code for one or more programs, the at least one memory and the computer code configured, with the at least one processor, to cause the apparatus at least to: cause said user equipment to transmit a first reference signal to a base station using a frequency band which is used by said base station to transmit to said user equipment, said user equipment having a different frequency band for transmitting to said base station.

According to another aspect, there is provided an apparatus for use in a user equipment, said apparatus comprising at least one processor and at least one memory including computer code for one or more programs, the at least one memory and the computer code configured, with the at least one processor, to cause the apparatus at least to: cause said user equipment to receive a second reference signal from a base station using a frequency band which is used by said user equipment to transmit to said base station, said user equipment having a different frequency band for receiving from said base station.

The received reference signal may be used to estimate channel information for a channel from said base station to said user equipment.

According to another aspect, there is provided an apparatus for use in a base station, said apparatus comprising at least one processor and at least one memory including computer code for one or more programs, the at least one memory and the computer code configured, with the at least one processor, to cause the apparatus at least to: cause said base station to receive a first reference signal from a user equipment on a frequency band which is used to transmit from said base station to said user equipment, said user equipment having a different frequency band for transmitting to said base station; and using said received reference signal to estimate channel information for a channel from said base station to said user equipment.

According to another aspect, there is provided an apparatus for use in a base station, said apparatus comprising at least one processor and at least one memory including computer code for one or more programs, the at least one memory and the computer code configured, with the at least one processor, to cause the apparatus at least to: cause said base station to transmit a second reference signal to a user equipment on a frequency band which is used by said user equipment to transmit to said base station to said user equipment, said user equipment having a different frequency band for receiving from said base station.

Various of the following features may be used with one or more of the above aspects.

The at least one memory and the computer code may be configured, with the at least one processor, to cause said reference signal to be transmitted or received in a subframe.

The subframe may comprise a first portion and a second portion separated by a guard period, wherein the first portion is used for uplink communication and the second portion is used for downlink communication.

The first portion may be provided before or after the second portion.

The first reference signal may be provided in said first portion.

The first reference signal may be transmitted from the user equipment. The first reference signal may be received by said base station.

Other signals may be provided in the second portion. In some embodiments, those other signals may be the second reference signal. In some embodiments, those other signals may be signals other than a second reference signal.

The second reference signal may be provided in said second portion.

The second reference signal may be transmitted from the base station. The second reference signal may be received by said user equipment.

Other signals may be transmitted in the first portion. In some embodiments, those other signals may be the first reference signal. In some embodiments, those other signals may be signals other than a first reference signal.

The first portion maybe an uplink pilot time slot and the second portion may be a downlink pilot time slot.

The at least one memory and the computer code may be configured, with the at least one processor, to control when said reference signal is transmitted in said subframe using timing advance control.

The at least one memory and the computer code may be configured, with the at least one processor, to configure the subframe having the reference signal.

The at least one memory and the computer code may be configured, with the at least one processor, to determine which of a plurality of subframes is the subframe having said reference signal. The configuring of the subframe may alternatively or additionally comprise determining a split in the subframe between the first portion, the second portion and the guard period.

The configuring the subframe may comprise selecting one of a plurality of subframe timing configurations for said subframe having the reference signal.

The at least one memory and the computer code may be configured, with the at least one processor, to configure reference signal resources for at least one user equipment.

The configuring of the reference signal resources may comprise determining which reference signal resources to use. The configuring of the reference signal resource may additionally comprise determining which subframe is to be used and/or which portion of said subframe is to be used.

The at least one memory and the computer code may be configured, with the at least one processor, to configure a timing of said subframe such that said subframe coincides with a further subframe for at least one user equipment which does not comprise a random access channel.

The at least one memory and the computer code may be configured, with the at least one processor, to configure the timing of said subframe such that said subframe coincides with a further subframe for at least one user equipment, said further subframe comprising a multi-media broadcast over a single frequency network subframe.

The at least one memory and the computer code may be configured, with the at least one processor, to receive signals from said user equipment on said different frequency band when receiving said first reference signal.

The at least one memory and the computer code may be configured, with the at least one processor, to prioritize one or more other transmissions over transmission of said reference signals.

The reference signal may comprise at least one of a sounding reference signal, a common reference signal and a channel state information reference signal.

A computer program comprising program code means adapted to perform the herein described methods may also be provided. In accordance with further embodiments apparatus and/or computer program product that can be embodied on a computer readable medium for providing at least one of the above methods is provided.

According to another aspect, there is provided an apparatus for use in a user equipment comprising: means for causing said user equipment to transmit a first reference signal to a base station using a frequency band which is used by said base station to transmit to said user equipment, said user equipment having a different frequency band for transmitting to said base station.

According to another aspect, there is provided an apparatus for use in a user equipment comprising: causing said user equipment to receive a second reference signal from a base station using a frequency band which is used by said user equipment to transmit to said base station, said user equipment having a different frequency band for receiving from said base station.

The received reference signal may be used to estimate channel information for a channel from said base station to said user equipment.

According to another aspect, there is provided an apparatus for use in a base station comprising: causing said base station to receive a first reference signal from a user equipment on a frequency band which is used to transmit from said base station to said user equipment, said user equipment having a different frequency band for transmitting to said base station; and using said received reference signal to estimate channel information for a channel from said base station to said user equipment.

According to another aspect, there is provided an apparatus for use in a base station comprising: causing said base station to transmit a second reference signal to a user equipment on a frequency band which is used by said user equipment to transmit to said base station to said user equipment, said user equipment having a different frequency band for receiving from said base station.

Various of the following features may be used with one or more of the above aspects.

The apparatus may comprise means for causing said reference signal to be transmitted or received in a subframe.

The subframe may comprise a first portion and a second portion separated by a guard period, wherein the first portion is used for uplink communication and the second portion is used for downlink communication.

The first portion may be provided before or after the second portion.

The first reference signal may be provided in said first portion.

The first reference signal may be transmitted from the user equipment. The first reference signal may be received by said base station.

Other signals may be provided in the second portion. In some embodiments, those other signals may be the second reference signal. In some embodiments, those other signals may be signals other than a second reference signal.

The second reference signal may be provided in said second portion.

The second reference signal may be transmitted from the base station. The second reference signal may be received by said user equipment.

Other signals may be transmitted in the first portion. In some embodiments, those other signals may be the first reference signal. In some embodiments, those other signals may be signals other than a first reference signal.

The first portion maybe an uplink pilot time slot and the second portion may be a downlink pilot time slot.

The apparatus may comprise means for controlling when said reference signal is transmitted in said subframe using timing advance control.

The apparatus may comprise means for configuring the subframe having the reference signal.

The means for configuring the subframe may determine which of a plurality of subframes is the subframe having said reference signal. The configuring of the subframe may alternatively or additionally comprise determining a split in the subframe between the first portion, the second portion and the guard period.

The configuring means may select one of a plurality of subframe timing configurations for said subframe having the reference signal.

The apparatus may comprise means for configuring reference signal resources for at least one user equipment.

The configuring of the reference signal resources may comprise determining which reference signal resources to use. The configuring of the reference signal resource may additionally comprise determining which subframe is to be used and/or which portion of said subframe is to be used.

The apparatus may comprise means for configuring a timing of said subframe such that said subframe coincides with a further subframe for at least one user equipment which does not comprise a random access channel.

The apparatus may comprise means for configuring the timing of said subframe such that said subframe coincides with a further subframe for at least one user equipment, said further subframe comprising a multi-media broadcast over a single frequency network subframe.

The apparatus may comprise means for receiving signals from said user equipment on said different frequency band when receiving said first reference signal.

The apparatus may comprise means for prioritizing one or more other transmissions over transmission of said reference signals.

The reference signal may comprise at least one of a sounding reference signal, a common reference signal and a channel state information reference signal.

It should be appreciated that any feature of any aspect may be combined with any other feature of any other aspect.

Embodiments will now be described in further detail, by way of example only, with reference to the following examples and accompanying drawings, in which:

FIG. 1 shows a Massive MIMO base station cell;

FIG. 2 schematically shows a subframe structure;

FIG. 3 schematically shows a UE/eNB operation according to one embodiment;

FIG. 4 schematically shows a UE/eNB operation according to another embodiment;

Before explaining in detail the exemplifying embodiments, certain general principles of a wireless communication system and mobile communication devices are briefly explained with reference to FIGS. 5 to 7 to assist in understanding the technology underlying the described examples.

In a wireless communication system mobile communication devices or user equipment (UE) 102, 103, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be part of the base station and/or provided by a separate entity such as a Radio Network Controller. In FIG. 5 control apparatus 108 and 109 are shown to control the respective macro level base stations 106 and 107. The control apparatus of a base station can be interconnected with other control entities. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

Figure 5:
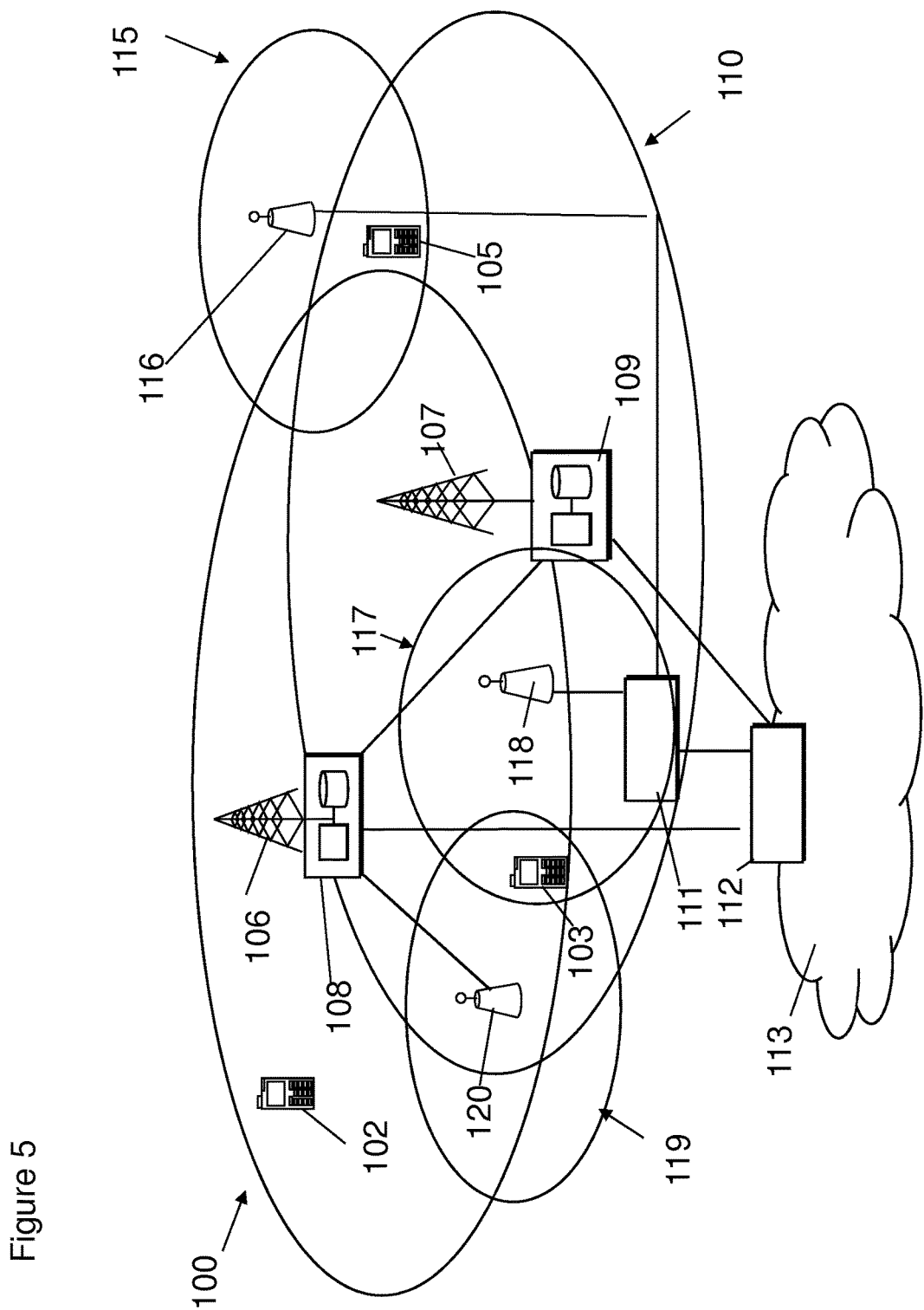
FIG. 5 shows a schematic diagram of a network according to some embodiments.

In FIG. 5 base stations 106 and 107 are shown as connected to a wider communications network 113 via gateway 112. Base station 106 provides cell 100 and base station 107 provides cell 110. A further gateway function may be provided to connect to another network.

The smaller base stations 116, 118 and 120 (providing respective cells 115, 117 and 119) may also be connected to the network 113, for example by a separate gateway function and/or via the controllers of the macro level stations. In the example, stations 116 and 118 are connected via a gateway 111 whilst station 120 connects via the controller apparatus 108. In some embodiments, the smaller stations may not be provided. The smaller base stations may provide a femto cell, a pico cell, a micro cell, and/or the like. One or more of the cells in a network may be have a closed subscriber group meaning that only some devices are able to use that cell.

Figure 6:
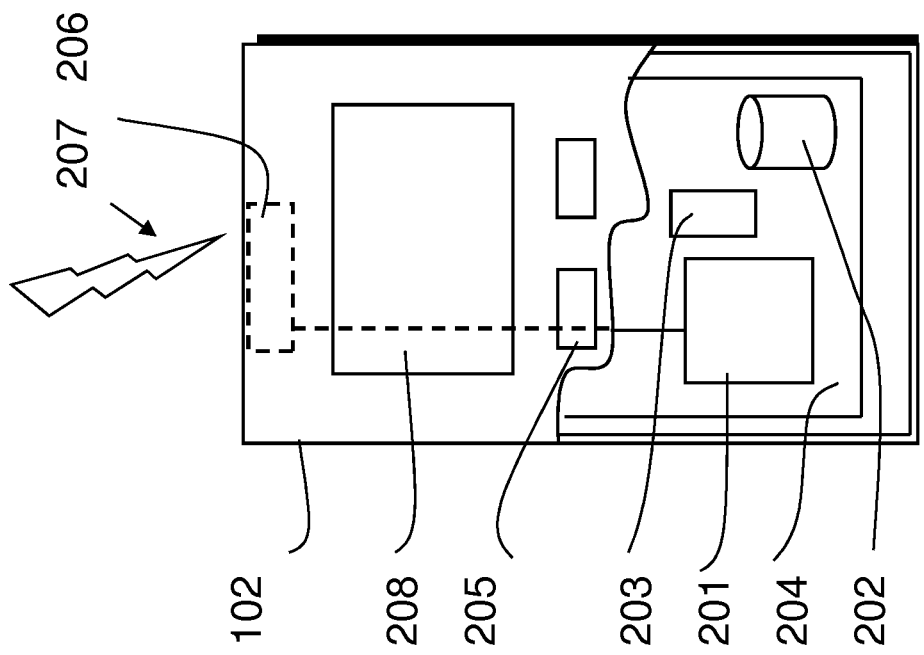
FIG. 6 shows a schematic diagram of a mobile communication device according to some embodiments.

A possible communication device will now be described in more detail with reference to FIG. 6 showing a schematic, partially sectioned view of a communication device 102. Such a communication device is often referred to as user equipment (UE) or terminal. An appropriate communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The device 102 may receive signals over an air or radio interface 207 via appropriate apparatus for receiving and may transmit signals via appropriate apparatus for transmitting radio signals. In FIG. 6 transceiver apparatus is designated schematically by block 206. The transceiver apparatus 206 may be provided for example by means of a radio part and associated antenna arrangement. The antenna arrangement may be arranged internally or externally to the device.

A device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the device by means of a suitable user interface such as key pad 205, voice commands, touch sensitive screen or pad, combinations thereof or the like. A display 208, a speaker and a microphone can be also provided. Furthermore, a communication device may comprise appropriate connectors (either wired or wireless) to other devices and/or for connecting external accessories, for example hands-free equipment, thereto.

The communication devices 102, 103, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs). Other examples of radio access system include those provided by base stations of systems that are based on technologies such as wireless local area network (WLAN) and/or WiMax (Worldwide Interoperability for Microwave Access). Some embodiments may be usable with so-called 5G systems or LTE-A or any other suitable system.

Figure 7:
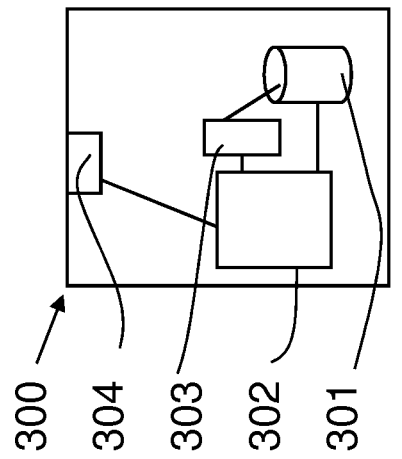
FIG. 7 shows a schematic diagram of a control apparatus according to some embodiments.

FIG. 7 shows an example of a control apparatus 300. This control apparatus may be provided in a base station, or any other suitable entity. The control apparatus can be configured to provide control functions. For this purpose the control apparatus comprises at least one memory 301, at least one data processing unit 302, 303 and an input/output interface 304. Via the interface the control apparatus can be coupled to receive and/or provide data. The control apparatus 300 can be configured to execute an appropriate software code to provide the control functions Some embodiments may relate to the acquiring of channel state information in a Massive MIMO (multiple input multiple output) system. Some embodiments may use frequency division duplex (FDD).

Massive MIMO (also called full dimension MIMO, large sale antenna systems, very large MIMO, Hyper MIMO and ARGOS) may allow a considerable performance enhancement on existing macro base station sites. Massive MIMO may be an enabler in exploiting higher frequencies (i.e. carrier frequencies up-to tens of gigahertz) which may suffer from poor path loss conditions in mobile communications.

The gain of Massive MIMO is based on the exploitation of a large-scale antenna array at the eNB side. The number of antenna ports at the eNB may be high, e.g. 32, 64 or even higher. High order Multi-User MIMO may be a gain mechanism behind Massive MIMO. The large-scale array allows energy to be focused into smaller regions of space. This may bring improvements in throughput and/or radiated energy efficiency. However there may be an increased complexity in the hardware (for example the number of RF (radio frequency) amplifier frontends required may be increased as compared to non Massive MIMO systems). Alternatively or additionally there may be an increased complexity and/or energy consumption of the signal processing at both ends (that is at the base station end and the UE end). Active antenna systems (AAS) may be an enabler for Massive MIMO.

Figure 1:
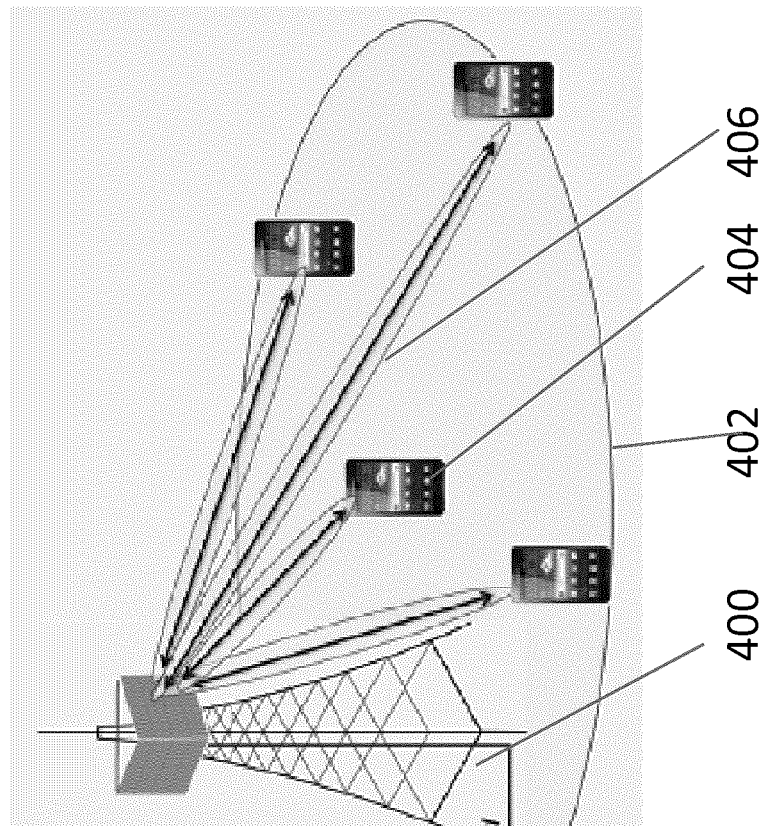

FIG. 1 schematically shows a base station 400 which is arranged to provide a cell 402 in which are provided a plurality of UEs 404. The base station is configured to provide a relatively narrow beam 406 for communication with each UE.

Some embodiments may provide an arrangement for acquiring accurate channel state information in a Massive MIMO FDD system based on leveraging UUDL (uplink/downlink) channel reciprocity.

Some embodiments may acquire channel state information (CSI) in a Massive MIMO system utilizing FDD spectrum. The CSI describes how a signal propagates from the transmitter to the receiver and makes it possible to adapt transmissions to current channel conditions. This may be used to achieve reliable communication with high data rates.

In a typical FDD scenario (such as LTE), CSI is estimated at the receiver, quantized and fed back to the transmitter. There has to be suitable reference signals available to perform CSI measurement at the UE. At least some parts of channel state information may need to be based on an estimate. This may be so e.g. because the channel conditions vary and so instantaneous CSI needs to be estimated on a short-term basis. A common approach for channel estimation is to use so-called training or pilot sequences or reference signals (RS) where known sequences or signals are transmitted and the CSI is estimated at the receiver based on these pilot signals. The estimation can be quantized and fed back to the transmitter. It is also possible that the receiver simply returns measurement results to the transmitter. CRS (cell specific reference signals) and CSI-RS act as such reference signals in LTE system.

Massive MIMO may pose of challenges for CSI acquisition:

The number of reference signals needed to perform CSI measurement increases as for example compared to LTE. This may create a relatively reference signal overhead offsetting some of the gains of Massive MIMO.

Massive MIMO may increase the CSI measurement burden at the UE end.

The amount of CSI to be conveyed via UL may be increased as compared to, for example, LTE. This may create a considerable CSI overhead on the UL side offsetting some of the gains of Massive MIMO Sensitivity to CSI impairments may increase when the number of transmission antennas increases. This is due to the transmission beams becoming narrower. CSI impairments (i.e. measurement errors due to interference and/or noise, quantization errors, delay in feedback link, etc.) may have a negative impact to the Massive MIMO performance.

Utilization of higher frequency bands may suffer from a reduced coherence time of the radio channel. CSI reporting periodicity may need to be increased compared to a scenario with a lower frequency band.

These challenges emphasize the need for finding alternative solutions for acquiring CSI in Massive MIMO system utilizing FDD spectrum. The considered alternative is based on leveraging UL/DL channel reciprocity.

In FDD, the UL and DL frequency bands are outside the coherence bandwidth of the radio channel, and thus the channel measured from the UL does not represent the DL channel. One exception is the wide area scenario with narrow azimuth spread. There, the long-term channel statistics may be fairly correlated between UL and DL frequency bands, and it is possible to exploit channel reciprocity to some extent:

eNB applies an array of correlated antennas (e.g. $\lambda/2$ -spaced);

Antenna calibration is applied; and eNB derives the DL beam from UL measurement

This approach may not feasible in scenarios where the azimuth spread becomes higher (i.e. when the antennas are lower). In environments with large azimuth spread (with respect to beam width) only a minor gain may be achieved by using UL Direction of Arrival (DoA)—estimation based beam forming. Hence, with Massive MIMO having very narrow beams the feasibility of DoA—estimation based DL beam forming may be limited.

TD-LTE (time division duplex) supports seven TDD UL-DL configurations, which are shown in Table 1 below (See for example 3GPP specification TS 36.211 table 4.2-2).

Communication in radio frames can be switched between uplink and downlink subframes. Switching from the downlink to the uplink can be provided on a subframe commonly referred to as a special subframe, denoted by "S" in Table 1. A special subframe comprises Downlink Pilot Timeslot (DwPTS) and Uplink Pilot Timeslot (UpPTS) fields. A guard period (GP) is provided between the downlink and uplink pilots. The guard period is used for switching from downlink to uplink and vice versa. Sub frame 1 and in UL-DL configurations 0, 1, 2 and 6 also subframe 6 are so called special sub frames (S) which comprise a DwPTS field, guard period (GP) and an UpPTS field.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

There are 10 different special subframe configurations, shown in Table 2 and for normal CP (cyclic prefix) in terms of OFDM symbols per field in Table 3.

TABLE 2

Special subframe configurations (see for example 3GPP specification TS 36.211 table 4.2-1)

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

TABLE 3

Special subframe configurations in terms of OFDM symbols per field for normal CP.

| Special subframe configuration | DwPTS | GP | UpPTS |
|---|---|---|---|
| 0 | 3 | 10 | 1 |
| 1 | 9 | 4 | 1 |
| 2 | 10 | 3 | 1 |
| 3 | 11 | 2 | 1 |
| 4 | 12 | 1 | 1 |
| 5 | 3 | 9 | 2 |
| 6 | 9 | 3 | 2 |
| 7 | 10 | 2 | 2 |
| 8 | 11 | 1 | 2 |
| 9 | 6 | 6 | 2 |

In some embodiments, an opportunity is provided for an eNB operating in an FDD mode to measure a signal (such as a sounding reference signal or the like) transmitted by UE on a downlink band. Some embodiments may facilitate a TDD type of (DL) MIMO functionality on the FDD system. (In TDD systems, the reciprocity properties of the radio channel can be exploited for example in transmit beam forming. Ideally, the channel state information is calculated from the received signal (such as SRS—sounding reference signal), and using the reciprocity principle, the transmit beam forming weights are calculated from so obtained CSI. However, in practice, the receiver and transmitter chains are not identical, and this difference needs to be compensated by a procedure referred to as antenna calibration. In the calibration procedure, the difference between the transmitter and receiver chains are calculated and compensated with calibration weights.

Some embodiments may use a predefined resource (to provide such an opportunity for eNB operating in an FDD mode to measure a signal transmitted by UE on a downlink band) where at least one UE is configured to transmit on DL band and the eNB is configured to receive on the DL band. A sufficient (or guard) time is provided for eNB/UE to switch between Tx (transmit) and Rx (receive) phases.

In some embodiments, a SRS (UL signal in LTE) is transmitted in the DL frequency band using UpPTS portion of the Special subframe.

In some embodiments, a predefined time resource may corresponds to a TD-LTE special subframe allocated to FDD DL band. A special subframe allocated to FDD DL may be the predefined resource and the SRS transmission via DL band may be made in the UpPTS portion of the special subframe.

An UL transmission of a UE and the eNB reception on the DL band is facilitated by means of UpPTS portion of the special subframe. Using the current special subframe configurations defined for TD-LTE there can be one or two OFDMA symbols in the UpPTS. In one preferred embodiment, the current SRS defined for LTE UL is used as sounding reference signal applied on the DL band (during UpPTS). The switching time is provided by the guard period. The DwPTS portion of the special subframe is used as "almost regular" DL resource to keep the overhead due to DL band sounding as small as possible. The number of OFDMA (orthogonal frequency division multiplexing) may be smaller than in a normal DL subframe.

It should be appreciated that some embodiments, a special subframe configuration may have more than two OFDMA symbols available for SRS transmission.

The example shown below this has a CP length of 14 symbols/subframe,

| Special subframe configuration | DwPTS | GP | UpPTS |
|---|---|---|---|
| A | 3 | 8 | 3 |
| B | 8 | 3 | 3 |
| C | 9 | 2 | 3 |
| D | 10 | 1 | 3 |
| E | 3 | 7 | 4 |
| F | 8 | 2 | 4 |
| G | 9 | 1 | 4 |

Figure 2:
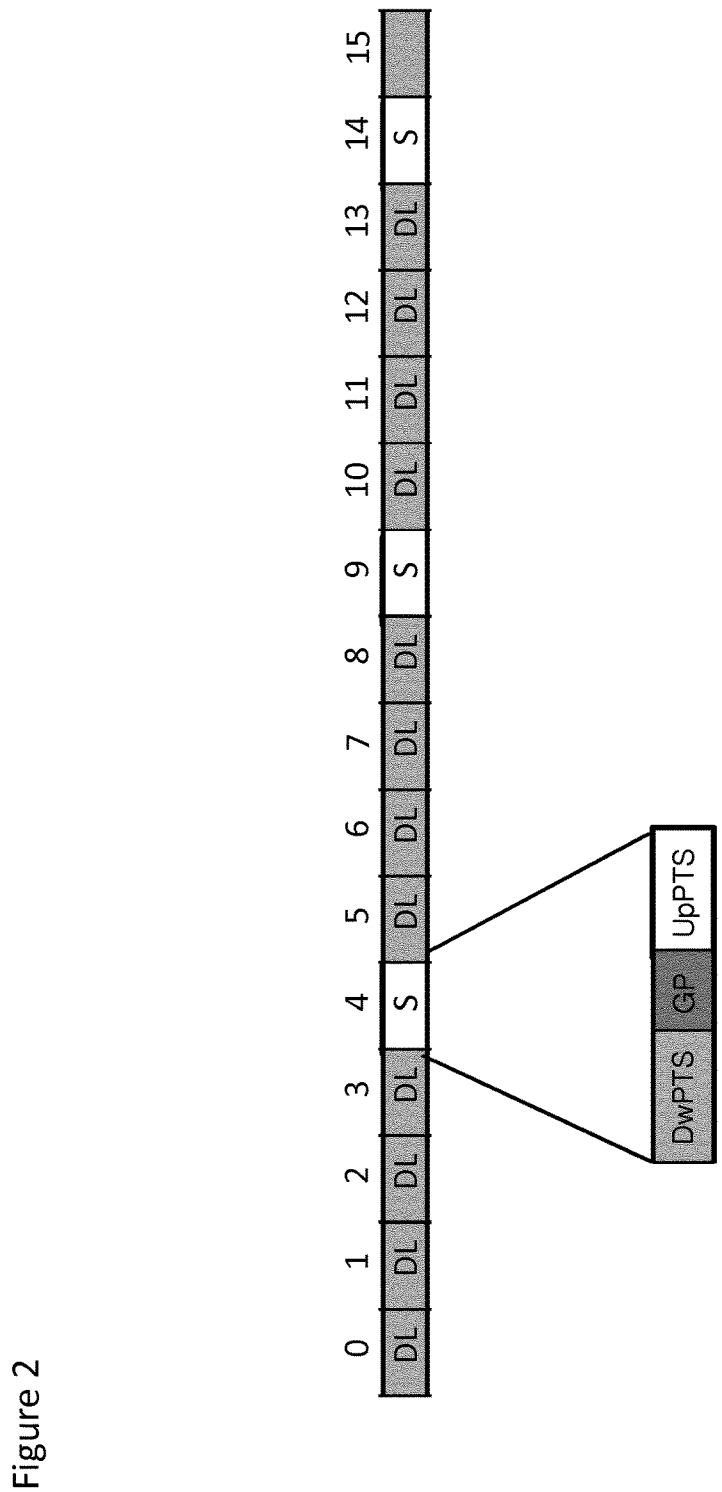

One embodiment is shown in FIG. 2 which shows the downlink frames (DL). In this example, a special subframe (S) periodicity equals to 5 ms and the subframe offset 4 ms, respectively. Every fifth frame is a special subframe. It should be appreciated that the eNB may use a special subframe as a downlink frame depending for example on if the eNB requires channel state information or change to a different pattern of DL and S subframes.

It should be noted that in practice, the GP functionality is divided into two parts (one before UpPTS and another after UpPTS). The division may be controlled using a timing advance parameter. In other words the time when the UE transmits the reference signal to the base station may be controlled by timing advance information. In an embodiment the timing advance information applied when transmitting signal via UL band is used also when transmitting SRS signal in UpPTS via DL band.

Some embodiments may provide backwards compatibility with an LTE system. In some embodiments, a MBSFN multi-media broadcast over a single frequency network subframe is configured for UEs not supporting special subframe arrangement on DL band (for example legacy UEs) for subframes having special subframe configured (i.e. subframes 4, 9, 14, . . . in the example of FIG. 2). This will ensure that UEs procedures such as CSI/RRM (radio resource management) measurements are not impacted by the DL band sounding.

Figure 3:
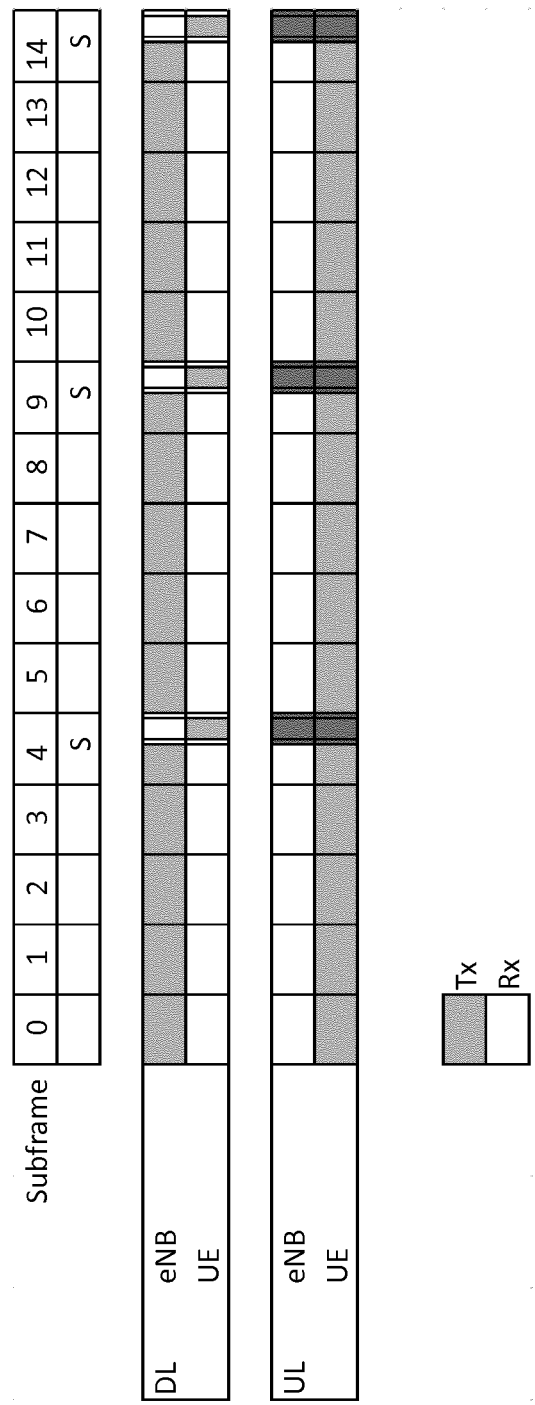

In some embodiments, simultaneous transmission and reception on DL band is not supported. This means that half-duplex operation on the DL band is provided. When a UE is transmitting on the DL band, the UE may not receive or transmit on the UL band. This embodiment is shown in FIG. 3. In other embodiments, a full duplex operation may be provided.

There are also other embodiments. For example, an eNB may support simultaneous reception on UL and DL bands. In this embodiment, the UL may be used for those UEs not configured to perform UL transmission on the DL band.

In some embodiments, a UE may support simultaneous transmission on UL and DL bands.

Figure 4:
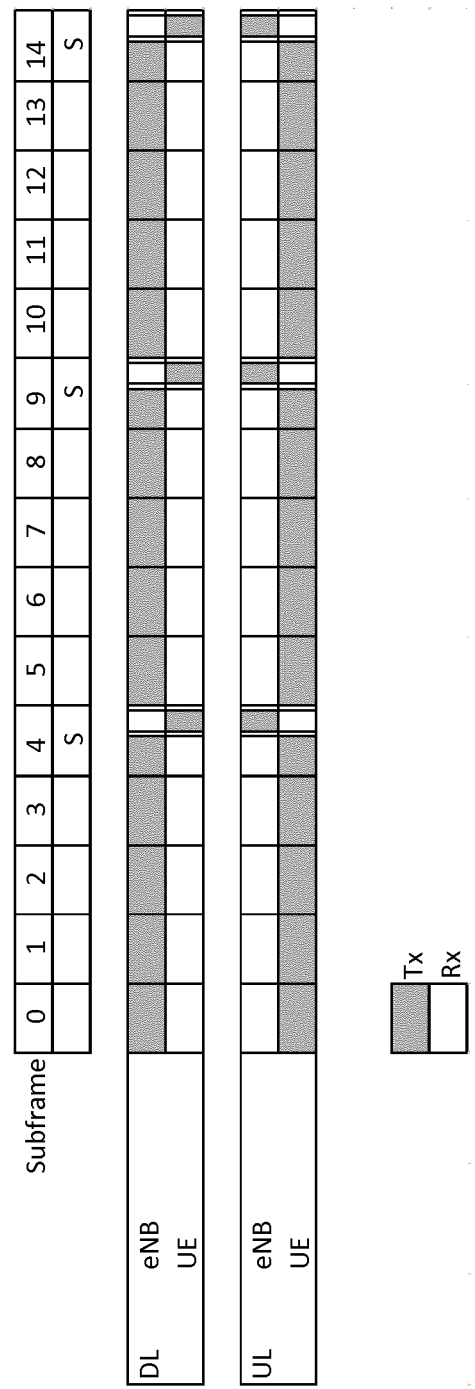

In some embodiments, alternatively or additionally uplink sounding may be provided. For example, the eNB may transmit the SRS or some other RS such as CRS or CSI-RS via the UL band, and the UE receives it. This allows usage of channel reciprocity in UL direction (e.g. non-codebook based UL precoding in FDD system). FIG. 4 shows this embodiment. In this embodiment, the eNB is transmitting SRS via the UL and the UE is transmitting SRS via DL during the same UpPTS. This assumes that the special subframe is applied in both the UL band and the DL band.

Alternatively or additionally, in some embodiments, the DwPTS (not UpPTS) portion of Special subframe is applied for UL sounding at the UE side. In this scenario, the eNB transmits a known RS, such as CRS, CSI-RS or any other suitable reference signal, using an UL band and DwPTS portion.

Figure 8:
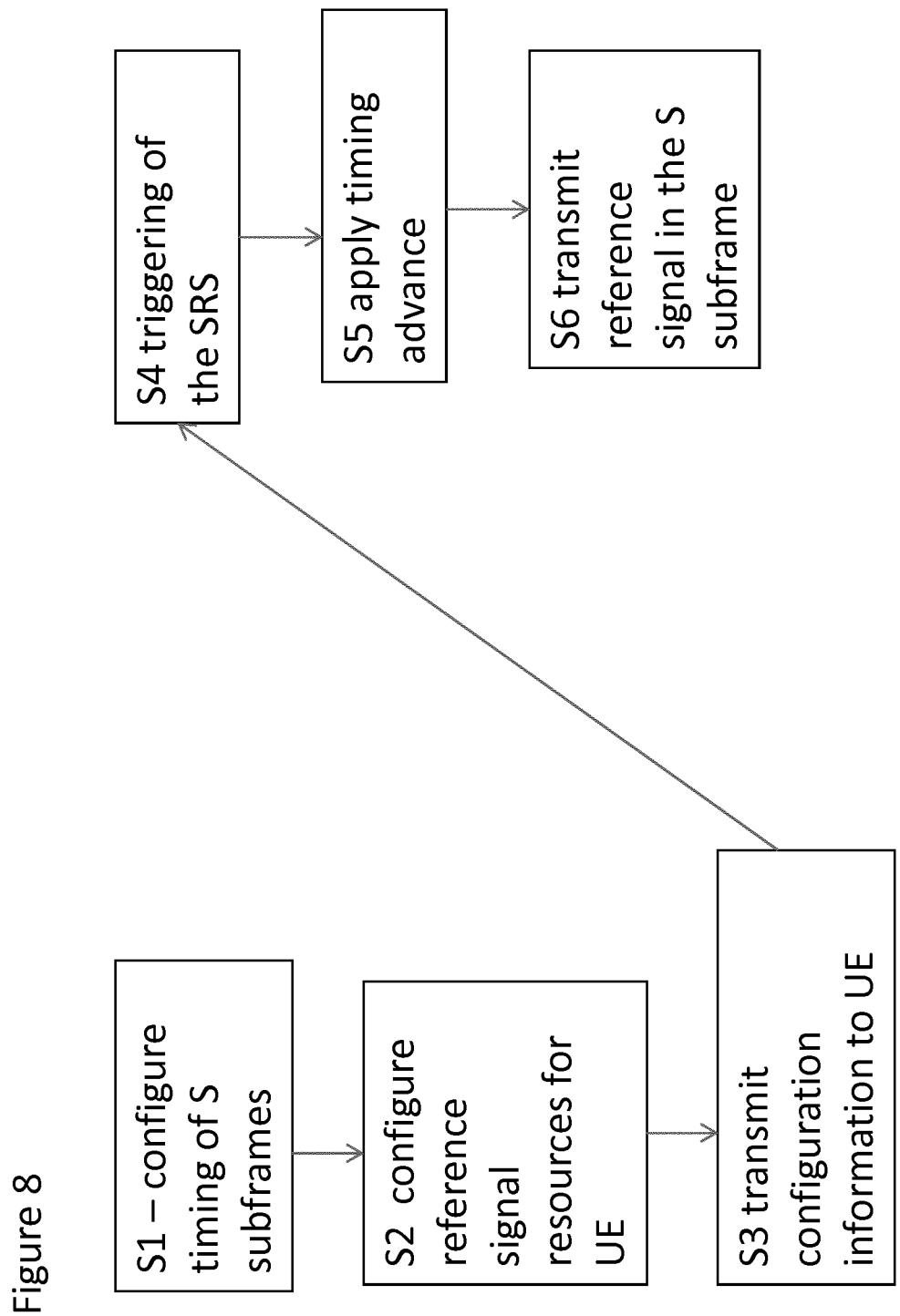
FIG. 8 shows a method of some embodiments.

Reference is made to FIG. 8 which shows a method of an embodiment.

In some embodiments, the eNB in step S1 configures or controls the configuring of the special S sub frames which are used for DL sounding. The eNB defines which (DL) subframes are used as a special subframe. The eNB defines the special subframe format.

This can be done using UE or cell-specific higher layer signaling. In some embodiments, selecting a predefined special subframe configuration for example from Table 3, may be part of the configuration.

The MBSFN subframe can be configured to UEs not supporting special subframe arrangement on DL band. These may correspond to subframes configured as special subframes (for those UEs supporting this feature). This may not be provided, for example if some embodiments are used with the FDD-UL band. In this case, eNB may ensure that the special subframe does not overlap with PRACH (physical random access channel). Further scheduler restrictions related to regular FDD-UL band usage may also be applied. For example the eNB may ensure that pending HARQ-retransmissions related to PUSCH are suspended. This may be done for example by means of a false ACK on PHICH (Physical Hybrid Automatic Repeat Request Channel).

The eNB configures certain SRS resources for different UEs in step S2. This may comprise RS parameters common to all UEs (e.g. SRS BW (bandwidth) allocation) and/or UE-specific SRS parameters. The configuration can include one or more of time and frequency resources (e.g. frequency comb, cyclic shift, PRB (physical resource block) allocation, OFDMA symbol, periodicity, subframe offset, and/or the like.)

Separate or the same SRS resources may be allocated to different Tx antennas of the UE.

This information may be provided to the UE in step S3.

In step S4, the triggering of the SRS occurs. The triggering of the SRS can be periodic or aperiodic. The triggering may be caused by the UE and/or the eNB. This may take into account configuration information.

In the case of aperiodic triggering, the UE may perform UL RF switching to DL frequency band only where triggering takes place. This triggering may be caused by the need to obtain a CSI. For example, there is a lot of data in the DL buffer. Otherwise, the UE may be able to transmit uplink signals via UL band during SRS subframe.

When transmitting SRS, the UE may apply timing advance commands used for regular UL operation, in step S5. In step S6, the reference signal is transmitted.

It should be appreciated that one or more of the steps may be combined. In some embodiments, one or more steps may be performed at the same time. In some embodiments one or more steps may be omitted. In some embodiments, one or more steps may be performed in a different order. In some embodiments, steps S4 and S5 may be repeated without receiving further configuration information from the eNB.

Some embodiments may be applied where a predefined special subframe can be dynamically changed to a normal subframe. For example, in the case there is no need in a certain subframe to obtain a CSI using DL SRS and/or when there is a need to transmit UL control during such subframe. This information may be included e.g. in downlink control information.

In some embodiments, the eNB may coordinate SRS transmissions among neighbouring cells in order to avoid UL/DL interference during UpPTS.

DwPTS can be seen as punctured DL subframe. The special subframe configuration defines the number of symbols available.

The eNB may apply one or more available scheduling and/or configuration options to minimize (or avoid) UL transmissions during special subframe k (especially UpPTS)

The eNB may apply DL scheduling restrictions for DL subframes (k-4) creating HARQ-ACK (hybrid automatic repeat request—acknowledgement) feedback (k)

The eNB may apply prioritization rules to handle collision. For example a regular UL has a priority over DL sounding.

The eNB may coordinate periodic CSI and scheduling requests and (regular) SRS transmissions so they do not overlap with special subframes.

In some embodiments, the PUCCH/PUSCH (physical uplink control channel/physical uplink shared channel) may have the duration of DwPTS or less.

In some embodiments, the subframe position for regular SRS transmission is such that it can be transmitted during DwPTS.

Some embodiments may require antenna calibration at the eNB.

For example, in TDD systems, the reciprocity property of the radio channel can be exploited for example in transmit beamforming. Ideally, the channel state information is calculated from the received signal, and using the reciprocity principle, the transmit beamforming weights are calculated from the channel state information. However, in practice, the receiver and transmitter chains may not be identical, and this difference needs to be compensated by a procedure referred to as antenna calibration.

In the calibration procedure, the difference between the transmitter and receiver chains are calculated and compensated with calibration weights. In order to be able to calculate the calibration coefficients, the transmitter to be calibrated uses the estimates of the received signals along with CSI measured from a transmitted reference signal that is fed back from another, assisting, device. Usually, this feedback CSI needs to be of high accuracy. This may means that, in practise, the estimates need to be integrated over a period of time.

A full gain may available in the scenario where the UE utilizes equal number of antennas in Tx and Rx side (e.g. 2 Rx, 2Tx or 4 Rx, 4Tx). Currently, most of the UEs have more antennas in Rx side (e.g. 2Rx, 1Tx). In some embodiments, it is possible to have this feature implemented only for UE categories having equal number of antennas in Tx and Rx side.

Some embodiments may provide one or more of the following advantages:

A cost-efficient MU-MIMO (multi user MIMO) solution to support Massive MIMO in a FDD system.

Some embodiments provide a common Massive MIMO solution applicable to both FDD and TDD systems/scenarios.

Some embodiments may be based on current building blocks defined for TD-LTE (e.g. special subframe). A form of implementation exists already.

Some embodiments may be backwards compatible.

eNB may have the capability to transmit control channels (PDCCH, PHICH, PCFICH) additionally during special subframes. This may mean that the DL control connection can be supported in all subframes.

Some embodiments may provide a CSI feedback solution for LTE on higher frequencies (e.g. 10 GHz)

Massive MIMO can be supported for an antenna array having low correlation between antenna elements (i.e. in a scenario with relatively large azimuth spread). This can be made with a higher number of antennas, and without complex CSI feedback schemes. This in turn may facilitate maximal gains from the Multi-User MIMO.

Some embodiments have been described in the context of a Massive MIMO system. It should be appreciated that other embodiments may be used in non-massive MIMO systems. Some embodiments may be used in any other suitable FDD system.

Some embodiments have been described as requiring CSI information. It should be appreciated that this is by way of example only and any other suitable information may alternatively or additionally be obtained.

A non-limiting example of the recent developments in communication system architectures is the long-term evolution (LTE) of the Universal Mobile Telecommunications System (UMTS) that is being standardized by the 3rd Generation Partnership Project (3GPP). Further development of the LTE is referred to as LTE-Advanced. Yet further developments such as 'beyond 4G' have also been considered. The LTE employs a mobile architecture known as the Evolved Universal Terrestrial Radio Access Network (E-UTRAN). Base stations or base station systems of such architectures are known as evolved or enhanced Node Bs (eNBs). An eNB may provide E-UTRAN features for cells such as user plane Radio Link Control/Medium Access Control/Physical layer protocols (RLC/MAC/PHY) and control plane Radio Resource Control (RRC) protocol terminations towards the communication devices. Other examples of radio access include those provided by base stations of systems that are based on technologies such as wireless local area network (WLAN) and/or WiMax (Worldwide Interoperability for Microwave Access).

Base stations are typically controlled by at least one appropriate controller apparatus so as to enable operation thereof and management of mobile communication devices in communication with the base stations. The control apparatus can be interconnected with other control entities. The control apparatus can typically be provided with memory capacity and at least one data processor. The control apparatus and functions may be distributed between a plurality of control units. In some embodiments, each base station can comprise a control apparatus. In alternative embodiments, two or more base stations may share a control apparatus. In some embodiments at least a part of control apparatus may be respectively provided in each base station.

Appropriate apparatus or means can be provided for controlling a communication device and a network element to provide the various embodiments.

The required data processing apparatus and functions of a base station apparatus, a communication device and any other appropriate element may be provided by means of one or more data processors or other means arranged to provide the required functions. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing determinations when, what and where to communicate and communications of information between the various nodes. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. An apparatus comprising at least one processor and at least one memory including computer code for one or more programs, the at least one memory and the computer code configured, with the at least one processor, to cause a base station operating in frequency division duplex (FDD) mode at least to:
receive an uplink reference signal from a user equipment using a downlink frequency band which is according to the FDD mode used by the base station to transmit to said user equipment, the base station having according to the FDD mode a different frequency band for receiving from said user equipment, wherein the uplink reference signal is received in a subframe comprising a first portion and a second portion separated by a guard period, wherein the first portion is used for uplink communication and the second portion is used for downlink communication, wherein said uplink reference signal is received in said first portion;
apply prioritization rules to handle collision of the uplink reference signal and other uplink transmission, wherein the other uplink transmission has a priority over the uplink reference signal; and
estimate, using said received uplink reference signal, channel information for the downlink frequency band, without the base station having to first transmit a downlink reference signal on the downlink frequency band.

2. The apparatus of claim 1, wherein the at least one memory and the computer code, with the at least one processor, are configured to further cause the base station to receive signals from said user equipment on said different frequency band when receiving said uplink reference signal.

3. The apparatus of claim 1, wherein the at least one memory and the computer code, with the at least one processor, are configured to further cause the base station to configure reference signal resources for the user equipment to transmit the uplink reference signal.

4. The apparatus of claim 1, wherein the at least one memory and the computer code, with the at least one processor, are configured to further cause the base station to configure a timing of the subframe on the downlink frequency band and comprising the uplink reference signal such that said subframe coincides with a further subframe for at least one user equipment, said further subframe comprising a multi-media broadcast over a single frequency network subframe.

5. The apparatus of claim 1, wherein the at least one memory and the computer code, with the at least one processor, are configured to further cause the base station to configure a timing of the subframe on the downlink frequency band and comprising the uplink reference signal, wherein configuring the subframe comprises selecting one of a plurality of subframe timing configurations for said subframe having the uplink reference signal.

6. The apparatus of claim 1, wherein the at least one memory and the computer code, with the at least one processor, are configured to further cause the base station to configure the subframe on the downlink frequency band and carrying the uplink reference signal by selecting one of a plurality of subframe configurations, wherein the plurality of subframe configurations differ in the allocation of symbols between the first portion, the second portion and the guard period.

7. The apparatus of claim 1, wherein the at least one memory and the computer code, with the at least one processor, are configured to further cause the base station to configure the subframe on the downlink frequency band and carrying the uplink reference signal, wherein configuring the subframe comprises configuring a timing of said subframe such that said subframe coincides with a further subframe for at least one user equipment which does not comprise a random access channel.

8. A method, comprising:
receiving, by a base station operating in frequency division duplex (FDD) mode, an uplink reference signal from a user equipment using a downlink frequency band which is according to the FDD mode used by the base station to transmit to said user equipment, the base station having according to the FDD mode a different frequency band for receiving from said user equipment, wherein the uplink reference signal is received in a subframe comprising a first portion and a second portion separated by a guard period, wherein the first portion is used for uplink communication and the second portion is used for downlink communication, wherein said uplink reference signal is received in said first portion;
applying prioritization rules to handle collision of the uplink reference signal and other uplink transmission, wherein the other uplink transmission has a priority over the uplink reference signal; and
estimating, using said received uplink reference signal, channel information for the downlink frequency band, without the base station having to first transmit a downlink reference signal on the downlink frequency band.

9. The method of claim 8, further comprising receiving signals from said user equipment on said different frequency band when receiving said uplink reference signal.

10. The method of claim 8, further comprising configuring reference signal resources for the user equipment to transmit the uplink reference signal.

11. The method of claim 8, further comprising configuring a timing of the subframe on the downlink frequency band and comprising the uplink reference signal such that said subframe coincides with a further subframe for at least one user equipment, said further subframe comprising a multi-media broadcast over a single frequency network subframe.

12. The method of claim 8, further comprising configuring a timing of the subframe on the downlink frequency band and comprising the uplink reference signal, wherein configuring the subframe comprises selecting one of a plurality of subframe timing configurations for said subframe having the uplink reference signal.

13. The method of claim 8, further comprising configuring the subframe on the downlink frequency band and carrying the uplink reference signal by selecting one of a plurality of subframe configurations, wherein the plurality of subframe configurations differ in the allocation of symbols between the first portion, the second portion and the guard period.

14. The method of claim 8, further comprising configuring the subframe on the downlink frequency band and carrying the uplink reference signal, wherein configuring the subframe comprises configuring a timing of said subframe such that said subframe coincides with a further subframe for at least one user equipment which does not comprise a random access channel.

15. A computer program product embodied on a computer readable medium and comprising computer executable instructions which when run in an apparatus cause a base station operating in frequency division duplex (FDD) mode to perform at least the following:
receiving an uplink reference signal from a user equipment using a downlink frequency band which is according to the FDD mode used by the base station to transmit to said user equipment, the base station having according to the FDD mode a different frequency band for receiving from said user equipment, wherein the uplink reference signal is received in a subframe comprising a first portion and a second portion separated by a guard period, wherein the first portion is used for uplink communication and the second portion is used for downlink communication, wherein said uplink reference signal is received in said first portion;
applying prioritization rules to handle collision of the uplink reference signal and other uplink transmission, wherein the other uplink transmission has a priority over the uplink reference signal; and
estimating, using said received uplink reference signal, channel information for the downlink frequency band, without the base station having to first transmit a downlink reference signal on the downlink frequency band.

16. The computer program product of claim 15, wherein the computer executable instructions further cause the base station to perform at least the following:
receiving signals from said user equipment on said different frequency band when receiving said uplink reference signal.

17. The computer program product of claim 15, wherein the computer executable instructions further cause the base station to perform at least the following:
configuring reference signal resources for the user equipment to transmit the uplink reference signal.

18. The computer program product of claim 15, wherein the computer executable instructions further cause the base station to perform at least the following:
configuring a timing of the subframe on the downlink frequency band and comprising the uplink reference signal such that said subframe coincides with a further subframe for at least one user equipment, said further subframe comprising a multi-media broadcast over a single frequency network subframe.

19. The computer program product of claim 15, wherein the computer executable instructions further cause the base station to perform at least the following:
configuring a timing of the subframe on the downlink frequency band and comprising the uplink reference signal, wherein configuring the subframe comprises selecting one of a plurality of subframe timing configurations for said subframe having the uplink reference signal.

20. The computer program product of claim 15, wherein the computer executable instructions further cause the base station to perform at least the following:
configuring the subframe on the downlink frequency band and carrying the uplink reference signal by selecting one of a plurality of subframe configurations, wherein the plurality of subframe configurations differ in the allocation of symbols between the first portion, the second portion and the guard period.

* * * * *